United States Patent [19]

Oertle et al.

[11] Patent Number: 4,519,899

[45] Date of Patent: May 28, 1985

[54] PURIFICATION OF OIL USING A JET PUMP MIXER

[75] Inventors: Jakob Oertle, Winterthur; Bruno Mülhaupt, Schlieren, both of Switzerland

[73] Assignee: Sulzer-Escher Wyss Ltd., Zurich, Switzerland

[21] Appl. No.: 554,453

[22] Filed: Nov. 22, 1983

[30] Foreign Application Priority Data

Dec. 13, 1982 [CH] Switzerland ........................ 7232/82

[51] Int. Cl.[3] ...................... C10M 11/00; B01D 21/01

[52] U.S. Cl. .................................. 208/179; 417/192; 417/151; 366/336; 366/337; 366/338; 366/339; 210/723; 210/737

[58] Field of Search ................ 208/179; 210/723, 737, 210/202, 738; 366/436, 437, 438, 439, 440; 137/888, 896; 417/192, 151

[56] References Cited

U.S. PATENT DOCUMENTS

| | | | |
|---|---|---|---|
| 2,000,741 | 5/1935 | Buckland | 417/151 |
| 2,038,103 | 4/1936 | Fraser | 417/151 |
| 2,899,374 | 8/1959 | Gomory | 137/896 |
| 3,529,719 | 9/1970 | Graybill | 210/738 |
| 3,726,297 | 4/1973 | Heimann et al. | 137/896 |
| 3,735,778 | 5/1973 | Garnier | 137/896 |
| 3,871,624 | 3/1975 | Huber et al. | 366/336 |
| 4,019,719 | 4/1977 | Schuster et al. | 366/338 |
| 4,093,188 | 6/1978 | Horner | 366/336 |
| 4,222,672 | 9/1980 | Shaw | 366/338 |
| 4,270,576 | 6/1981 | Takeda et al. | 366/337 |
| 4,285,638 | 8/1981 | Clark | 417/198 |
| 4,293,424 | 10/1981 | Baur et al. | 208/179 |
| 4,310,288 | 1/1982 | Erickson | 417/198 |

FOREIGN PATENT DOCUMENTS

| | | | |
|---|---|---|---|
| 52-68064 | 6/1977 | Japan | 210/738 |
| 47140 | 4/1980 | Japan | 137/888 |
| 2035816 | 6/1980 | United Kingdom | 210/738 |
| 0662117 | 5/1979 | U.S.S.R. | 210/738 |

OTHER PUBLICATIONS

Perry & Chilton, "Chemical Engineer's Handbook", 5th Ed., pp. 19-9 and 6-15.

*Primary Examiner*—D. E. Gantz
*Assistant Examiner*—Lance Johnson
*Attorney, Agent, or Firm*—Robert A. Ostmann

[57] ABSTRACT

In the purification of oil used for example in light metal rolling, and contaminated by abraded particles, a coagulating agent, for example an aqueous soda solution, is added by means of a dosaging device (7) and mixed in a device (5) which comprises a static dispersing device (8) with a jet pump (9) connected thereafter with a recirculation loop (10). The mixing is normally carried out at an elevated temperature and a heating step (3,4) included. After mixing, the coagulates formed are separated, typically in a centrifuge (14). The invention is particularly suited to the purification of the rolling oil occurring in the manufacture of aluminium foils.

8 Claims, 1 Drawing Figure

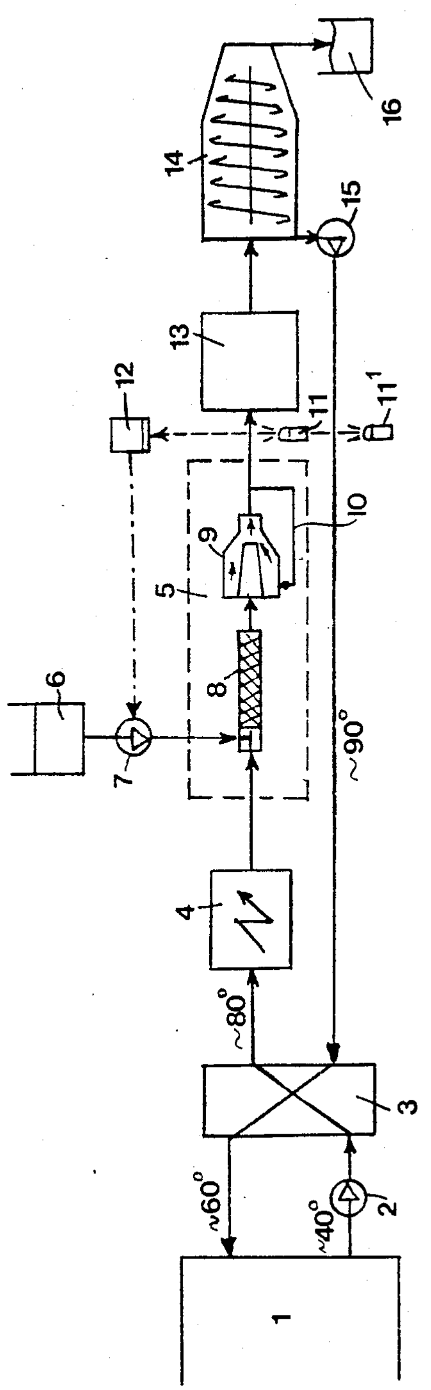
1
2
3
4
5
6
7
8
9
10
11
11'
12
13
14
15
16
~60°
~40°
~80°
~90°

PURIFICATION OF OIL USING A JET PUMP MIXER

BACKGROUND OF THE INVENTION

The invention relates to the purification of oil containing metal particles, particularly rolling oil which contains abraded particles of rolled metals. In such purification, a coagulating agent is added to the heated oil, with which the particles form coagulates, which coagulates can thereafter be separated by for example, sedimentation or centrifuging.

In the rolling of metals, in particular light metals, as in the manufacture of aluminium foils, rolling oils of various types are used, for example for cooling, lubrication and improvement in quality of the surface. Petroleum base cold rolling oils are typical rolling oils. The rolling oil is normally in a circuit for repeated use, and requires occasional clearing or purification. The abraded particles occurring on rolling, for example of the finest aluminium particles with diameters between 0.01 and 10 μm, for the most part accumulate in the rolling oil. A satisfactory surface of the roller material; e.g., the aluminium foil, can only be achieved, however, when the content of abraded particles in the rolling oil does not exceed a certain concentration.

It is already known to purify rolling oils by means of alumina or kieselguhr filters. However, these techniques are expensive, since the elimination of a certain quantity of abraded metal particles requires a considerable amount in filters and used filters can contain up to 45% of their own weight in rolling oil. This rolling oil must be removed by extraction or roasting, in order to obtain a form of the filter means which is able to be deposited.

Attempts have also been made to remove abraded metal particles from rolling oil through sedimenting or centrifuging. However, it has been found that particularly metal particles of small diameter do not settle out or only do so with extreme difficulty, clearly as a result of electrostatic charges.

U.S. Pat. No. 4,293,424 discloses a method for the purification of rolling oil from metal particles in which an aqueous, alkaline solution of an inorganic salt, in particular a soda solution, is added to the rolling oil. This causes abraded particles to form coagulate which can during a specific period of time be separated; e.g., by sedimentation or centrifuging. The quantity of the added agent can be very small, and lies within the parts per thousand range. The aim is to add precisely as much soda solution as is fully absorbed by the abraded particles. In this way, almost pure rolling oil, which is almost free of abraded particles, is obtained as filtrate, which can be used again without difficulty. On the other hand a substance is obtained as waste material consisting primarily of abraded metal particles, which can be processed in communal refuse combustion installations. The loss of rolling oil in this method is extremely low in comparison with previously known filter methods.

The last mentioned method demonstrates very good results in practice. However, success depends on the correct quantity of coagulation agent being added and on the small added quantities being evenly distributed in the rolling oil. This can be difficult in the short period of time available for an even intermixture in a closed circuit system. Thus despite the correct added quantity of coagulation agent, the distribution can be so irregular that the coagulating agent is partially insufficient in some areas, where residues of abraded particles do not coagulate, but excessive in other areas, forming an aqueous lower stratum in the separator, which after a short period of time leads to difficulties such as boehmite formation and clogging.

SUMMARY OF THE INVENTION

The present invention seeks to overcome the latter disadvantages of the prior art and in particular to develop the technique of U.S. Pat. No. 4,293,424 such that an accurate dosaging and an even distribution of the coagulating agent in the oil is achieved, thereby further improving the quality of the purified oil.

According to the invention a device is provided for the admixture of coagulating agent with oil containing metal particles, which device comprises a static dispersing device and a jet pump connected in series; and a recirculation loop for recycling a part of the output from the jet pump to its inlet. In the method of the invention, a coagulating agent is added to the oil containing metal particles and mixed in such a device, and the coagulates thus formed are then separated, for example by sedimentation or centrifuging. Recycling of the admixture to the jet pump inlet may be accomplished using the suction of the jet pump itself. The rolling oil will normally be at an elevated temperature for treatment, and an heating step will normally be included. At least partial heating may be accomplished by passing (hot) purified oil in heat exchange relation with incoming (cool) contaminated oil.

Static dispersal devices which have been found suitable in the present invention are those which have elements; e.g., grooved lamellae, which are layered on top of each other such that open, intersecting channels are formed, which run oblique to the main direction of through flow. In a preferred form, several layers of elements are provided, with successive layers arranged staggered about an angle not exceeding 90°.

The method according to the invention has proved to be particularly suitable for the purification of rolling oil which occurs in the rolling of light metal, specifically aluminium foils. By the method according to the invention aluminium foils can be produced with a clearly improved surface quality.

BRIEF DESCRIPTION OF THE DRAWING

The invention will now be described by way of example and with reference to the accompanying drawing which shows, in diagrammatic form a purification process according thereto.

DESCRIPTION OF THE PREFERRED EMBODIMENT

Hot rolling oil, containing metal particles and at approximately 40° C., is removed by suction from a rolling oil container 1 by means of a pump 2, and heated to approximately 80° C. in a heat exchanger 3, by returning purified oil. A further temperature increase, to 90° C. to 95° C., takes place in a following heater 4. The oil then passes to a mixing device 5 where a coagulating agent from a storage container 6 is added to the rolling oil in a ratio of, for example from 1:1000 to 1:5000, by means of a dosaging pump 7.

An aqueous, alkaline solution of an inorganic salt is used as the coagulating agent; preferably a soda solution saturated to approximately 75%. Apart from $Na_2CO_3$, however, other salt solutions have also shown themselves to be suitable, for example $NaOH—Na_2CO_3$, $K_2CO_3$ or $KOH—K_2CO_3$.

The mixing device 5 consists of a static dispersing device 8 and a jet pump 9 connected thereafter, with a recycling loop whereby a part of the rolling oil leaving the jet pump is returned by means of the jet pump's own suction effect back to its inlet. The mixing devices described in U.S. Pat. No. 3,871,624 for example have proved to be suitable, or commercial static mixers, for example of the Sulzer SMX type or BKM type, as static dispersing devices. Such mixers contain elements for example grooved lamellae, which are layered on top of each other such that open intersecting channels are formed, which run obliquely to the main direction of through flow of the mixer. Expediently several such piles of layers are arranged one behind the other, whereby successive layers are arranged staggered about an angle not exceeding 90°. Pumps of the Körting type 13.39.00 have proven, for example, to be suitable as jet pumps, with a driving stream of 750 l/h and a corresponding suction stream, takinto account the reaction or recirculation loop. In such a mixing device composed of a static mixer and jet pump with recirculation loop, a surprisingly good intermixture and improved distribution of coagulating agent was achieved in rolling oil in comparison with static mixing devices consisting of only one part. Compared with dynamic mixers it is advantageous that there are no moving or rotating parts, which are subject to wear. In addition, it was shown that with such a combined mixing device a substantially completely homogeneous distribution of the coagulating agent can be achieved, even with the use of an intermittently operating dosaging device 7, for example a simple and inexpensive piston pump, which was difficult and problematic in conjunction with previously used mixers.

The light absorption of the rolling oil emerging from the mixer 5 is measured by means of a photometer apparatus consisting of a light source 11 and a photoreceiver 12, and is used to regulate the dosaging device 7, for example through adjusting the piston stroke of the piston pump serving as dosaging device, or the frequency. In this way, precisely the correct quantity of soda can be added which is required for substantially complete coagulation of the abraded metal particles. Through the even distribution in the mixer 5 the or any fluctuations in the dosaging of coagulating agent can be largely, if not completely eliminated. Since the regulating line acts slowly, it is expedient to use an intermittent follow-up control, whereby the normal quantity is compared periodically with the desired value and the deviation produces a corresponding correction of the regulated quantity; i.e., of the dosing pump frequenty or of the piston stroke.

The rolling oil emerging from the mixing device 5 is passed to a coagulating container 13, in which the coagulation of the abraded particles is completed. The size of this coagulation container is dimensioned such that with the selected rolling oil throughput of the device a reaction time is available in the container such that substantially all the abraded particles coagulate. Owing to the particularly good and homogeneous intermixture, the reaction takes place particularly evenly and quickly, so that the coagulation container 13 can be dimensioned smaller than hitherto. With the intensive mixing which is achieved, a coagulation container with an average dwell period of approximately 20 seconds has proven to be favourable. Immediately on conclusion of the coagulation process the rolling oil is passed to a centrifugal decanter 14 in which the coagulated material is separated from the filtrate; i.e., from the pure rolling oil. A centrifugal decanter, for example, of the type Escher Wyss ZDS-IL is suitable. The filtrate emerging from the centrifugal decanter 14, largely free of abraded particles and at a temperature of approximately 90° C., is passed by a feed pump 15 to the heat exchanger 3, in which it heats the rolling oil which is to be purified, and returns, purified, from the heat exchanger 3 at a temperature of approximately 60° C. to the rolling oil container 1.

In the use of a system as described above in a rolling oil purification installation for the production of aluminium foil, an intensely contaminated rolling oil with a 0.3% oxide ash content was purified at a volume flow of 900 liters/hour. A 5 liter coagulation container (13) was used with a dwell period of 18 seconds, and a soda dosing of 1.7 liters/hour, and the temperature ratios mentioned. The purified oil had an oxide ash content of 0.002%. In the purification of rolling oil which is less contaminated, final concentrations below 0.001% were able to be achieved with the experimental plant.

In a further development of the invention the regulation of the dosaging of coagulating agent can also be controlled by a measurement of the absorption of the purified rolling oil following the centrifugal decanter 15 by means of a radiation source 11[1] and a photo-receiver 12.

We claim:

1. A method of purifying oil containing metal particles comprising adding to the oil a coagulating agent which forms coagulates with the metal particles; mixing the oil and agent in a mixing means including a static dispersion device, a jet pump coupled to the outlet from the dispersing device, and a recycling loop which utilizes the suction of the jet pump itself to recirculate a portion of the mixture from the outlet to the suction inlet of the jet pump; and separating coagulates formed with the agent and metal particles from the mixture to thereby produce purified oil.

2. A method according to claim 1 wherein the coagulates are separated by one of sedimentation and centrifuging.

3. A method according to claim 1 wherein the coagulating agent is added to the oil at a ratio in the range 1:1000 to 1:5000 by volume.

4. A method according to claim 3 wherein the coagulating agent is an aqueous alkaline solution of an inorganic salt.

5. A method according to claim 4 wherein the solution is a carbonate solution selected from $Na_2CO_3$; $NaOH—Na_2CO_3$; $K_2CO_3$; and $KOH—K_2CO_3$.

6. A method according to claim 1 including the step of heating the oil to an elevated temperature.

7. A method according to claim 6 wherein said heating includes passing the oil containing metal particles in heat exchange relation with the purified oil prior to addition of the coagulating agent thereto.

8. A method according to any preceding claim wherein the oil being purified is used in the rolling of light metals.

* * * * *